C. POTTEL.
INJECTOR.
APPLICATION FILED JULY 12, 1911.

1,016,772.

Patented Feb. 6, 1912.
2 SHEETS—SHEET 1.

Witnesses:

Inventor:
Carl Pottel
by Attorney.

C. POTTEL.
INJECTOR.
APPLICATION FILED JULY 12, 1911.

1,016,772.

Patented Feb. 6, 1912.
2 SHEETS—SHEET 2.

Inventor:
Carl Pottel

UNITED STATES PATENT OFFICE.

CARL POTTEL, OF HALLE-ON-THE-SAALE, GERMANY.

INJECTOR.

1,016,772.  Specification of Letters Patent.  Patented Feb. 6, 1912.

Application filed July 12, 1911. Serial No. 638,056.

*To all whom it may concern:*

Be it known that I, CARL POTTEL, engineer, a subject of the Emperor of Germany, residing at Halle-on-the-Saale, Germany, have invented certain new and useful Improvements in Injectors, of which the following is a clear, full, and exact description.

The method heretofore commonly adopted for making the nozzles in an injector removable consists in screwing the nozzles into removable tubular insertion, or in connecting them to each other by screwed couplings so that they can be collectively withdrawn.

The object of the present invention is to obviate the use of screwing in this connection with a view to removing the disadvantages which arise from binding, due to heat and deposit of scale, and the risk of distortion, which may, on reassembling the parts, interfere with the proper positioning of the same and thus reduce the efficiency of the apparatus.

According to the present invention the nozzles are slidably inserted into the casing or into a tubular insertion in the same, and are provided with abutments by means of which they abut against each other in series and are thus accurately positioned in relation to each other and to the casing.

Figure 1:
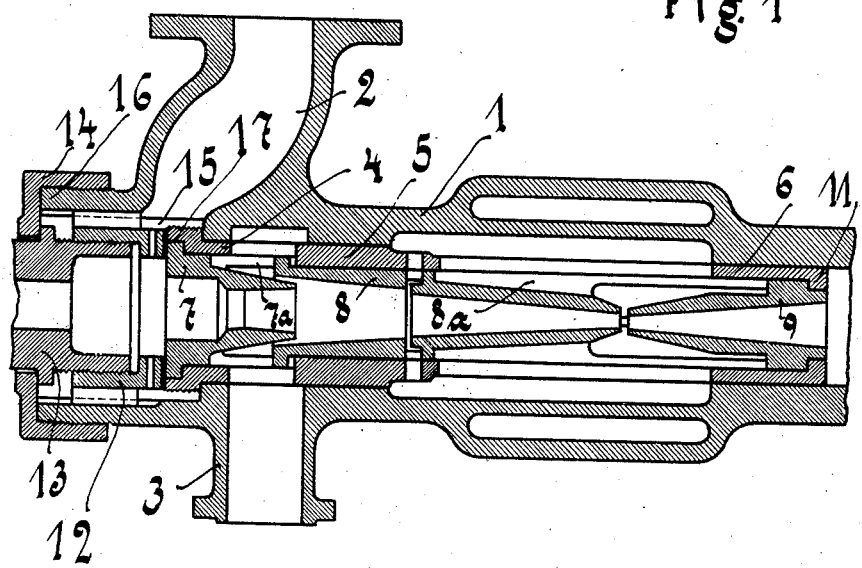
Figure 2:
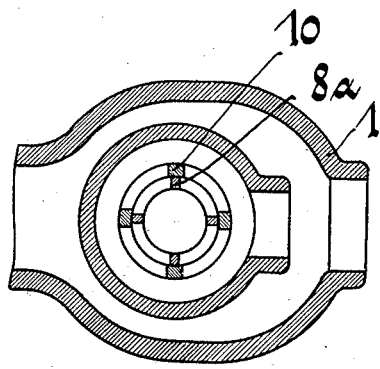
Figure 3:
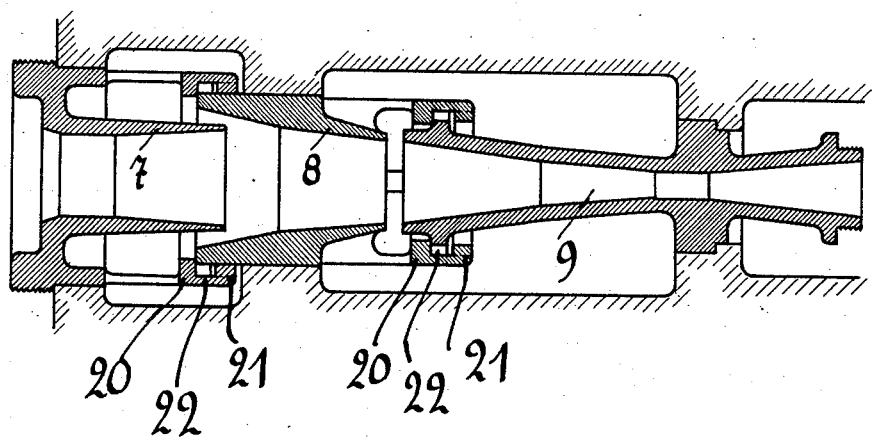
Figure 4:
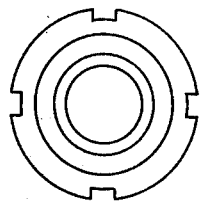

The invention is illustrated in the accompanying drawing, Figures 1 and 2 showing one form of construction, and Figs. 3 and 4 another.

Referring in the first place to Figs. 1 and 2, which are a longitudinal section and a cross-section respectively, the apparatus comprises a casing 1, with a steam supply port 2 and a water supply port 3. The casing contains a tubular piece 4 which fits against the wall of the casing at the parts where the said piece supports the nozzles 7, 8 and 9. The part 4 has apertures for inlet and outflow of water, the said apertures being formed between the narrow connecting pieces 10 shown in Fig. 2. The tubular piece 4 is made tight with the casing in the usual manner, by insertion of filaments or the like, and the nozzles fit into the tube and have ribs 7ª and 8ª arranged so that the nozzles abut against each other in series though having clearance between their orifices. The pressure or discharge nozzle 9 abuts against a flange 11 of the tube 4, and the steam nozzle 7 and sleeve abut, flush with each other, against a nut 12 screwed on to the end part 13 of the injector, over which a nut 14 is screwed. To prevent rotation of the nut 12 in the casing, the nut has ribs 15 engaging grooves in the wall of the casing. The intermediate nut 12 is used for the reason that the nut 14 cannot make a tight joint both at 16 and 17; but by slightly turning the part 13 the non-rotatable nut 12 screwed thereon can be firmly pressed against the surface 16.

For disconnecting the parts, it is only necessary to unfasten the nut 14, which is not liable to bind, being external, and the parts 13 and 12, and the nozzles, can then be withdrawn, without requiring unscrewing. The said parts can then be inserted again by merely pushing them in, in the proper order, these parts being properly positioned by virtue of the abutment thereof against each other, as described. Tightening up, if necessary, can be effected by turning the part 13, as described. The whole operation being performed from one end of the apparatus, the other end can, without causing inconvenience in use, be placed in an inaccessible position.

In the construction shown in Figs. 3 and 4 the nozzles are not mounted in a tubular insertion, but are coupled with each other so that they can be collectively withdrawn and then separated. For this purpose the nozzles have coacting coupling members, which, in the construction shown, are of the bayonet coupling type. The steam nozzle 7 and the mixing or combining nozzle 8 have annular coupling members 20, which form abutments for the nozzles 8 and 9 and have dogs 21 which can pass through gaps 22 in flanges on the nozzles 8 and 9, and interlock with the latter on the coupling members being rotated.

A modification which may be made without departing from the principle of the invention consists in making the mixing or combining nozzle extend beyond the end of the injector, and inserting the pressure or discharging nozzle into the prolongation.

What I claim is:

1. In combination, in injectors, a casing, a series of nozzles slidably inserted in said casing and having parts abutting against each other and collars abutting against relatively stationary parts, a collar mounted loosely and externally on one member of said casing and coöperating with screw-threads on the end of the other member of said casing to connect the same detachably, a nut mounted on the former member inside of the latter member and provided with ribs which fit into grooves in said latter member to lock said nut against rotation, whereby it may be adjusted longitudinally of said last member to tighten the above connection and the engagement between the various nozzles and said nozzles and said intermediate nut substantially as set forth.

2. In combination, in injectors, a casing consisting of two members, a nut loosely mounted on one member for connecting said members, a cage mounted in the other of said members and having an annular flange which holds it in position and a series of nozzles mounted in said cage, said nozzles having shoulders which engage annular flanges in said cage and ribs which engage the shoulder of the adjacent nozzle for holding said nozzles in position and means for tightening the connection between said members of said casing and the engagement between said casing and said cage and between said nozzles in said cage, substantially as set forth.

3. In combination, in injectors, a casing consisting of two members, a nut loosely mounted on one member for connecting said members, a series of nozzles removably mounted as a unit in said casing and means for tightening the connection between said members of said casing and the engagement between said casing and said series of nozzles substantially as set forth.

Signed this 27th day of June, 1911.

CARL POTTEL.

Witnesses:
ALBERT R. MORAWETZ,
RUDOLPH FRICKE.

---

Copies of this patent may be obtained for five cents each, by addressing the "Commissioner of Patents, Washington, D. C."